(12) United States Patent
Bishop et al.

(10) Patent No.: US 8,656,333 B1
(45) Date of Patent: Feb. 18, 2014

(54) INTEGRATED CIRCUIT PACKAGE AUTO-ROUTING

(75) Inventors: Craig Bishop, Tucson, AZ (US); Christopher Scanlan, Chandler, AZ (US); Tim Olson, Phoenix, AZ (US)

(73) Assignee: Deca Technologies, Inc., Tempe, AZ (US)

(*) Notice: Subject to any disclaimer, the term of this patent is extended or adjusted under 35 U.S.C. 154(b) by 0 days.

(21) Appl. No.: 13/466,049

(22) Filed: May 7, 2012

Related U.S. Application Data

(63) Continuation-in-part of application No. 12/876,915, filed on Sep. 7, 2010.

(60) Provisional application No. 61/305,125, filed on Feb. 16, 2010.

(51) Int. Cl.
| | |
|---|---|
| G06F 17/50 | (2006.01) |
| H01L 23/48 | (2006.01) |
| H01L 23/52 | (2006.01) |
| H01L 29/40 | (2006.01) |

(52) U.S. Cl.
USPC ............ 716/119; 716/137; 257/737; 257/784

(58) Field of Classification Search
None
See application file for complete search history.

(56) References Cited

U.S. PATENT DOCUMENTS

| | | | | |
|---|---|---|---|---|
| 5,465,217 | A * | 11/1995 | Yip et al. | 716/115 |
| 6,249,047 | B1 * | 6/2001 | Corisis | 257/691 |
| 6,392,301 | B1 | 5/2002 | Waizman et al. | |
| 7,659,622 | B2 * | 2/2010 | Dauksher et al. | 257/737 |
| 7,772,696 | B2 * | 8/2010 | Hunter | 257/737 |
| 7,928,563 | B2 * | 4/2011 | Bakir et al. | 257/713 |
| 8,084,871 | B2 * | 12/2011 | Rahim et al. | 257/784 |
| 2001/0020735 | A1 * | 9/2001 | Chikawa et al. | 257/678 |
| 2005/0248022 | A1 * | 11/2005 | Badr et al. | 257/690 |
| 2008/0230889 | A1 | 9/2008 | Standing | |
| 2008/0288908 | A1 * | 11/2008 | Hart et al. | 716/15 |
| 2009/0057888 | A1 * | 3/2009 | Hunter | 257/737 |
| 2011/0074041 | A1 | 3/2011 | Leung | |
| 2011/0108981 | A1 * | 5/2011 | Rahim et al. | 257/737 |
| 2011/0154277 | A1 * | 6/2011 | Ankenbauer et al. | 716/103 |

\* cited by examiner

*Primary Examiner* — A. M. Thompson
(74) *Attorney, Agent, or Firm* — Booth Udall Fuller, PLC

(57) ABSTRACT

A plurality of approaches for forming a semiconductor device using an adaptive patterning method is disclosed. Some approaches include placing a semiconductor die unit on a carrier element, calculating trace geometry for a second set of traces, constructing a prestratum comprising a first set of traces, and constructing the second set of traces according to the calculated trace geometry. Forming the semiconductor device may further include electrically connecting at least one of the first set of traces to at least one of the second set of traces, and electrically connecting at least one bond pad of the semiconductor die unit to a destination pad through the at least one of the first set of traces and the at least one of the second set of traces.

19 Claims, 8 Drawing Sheets

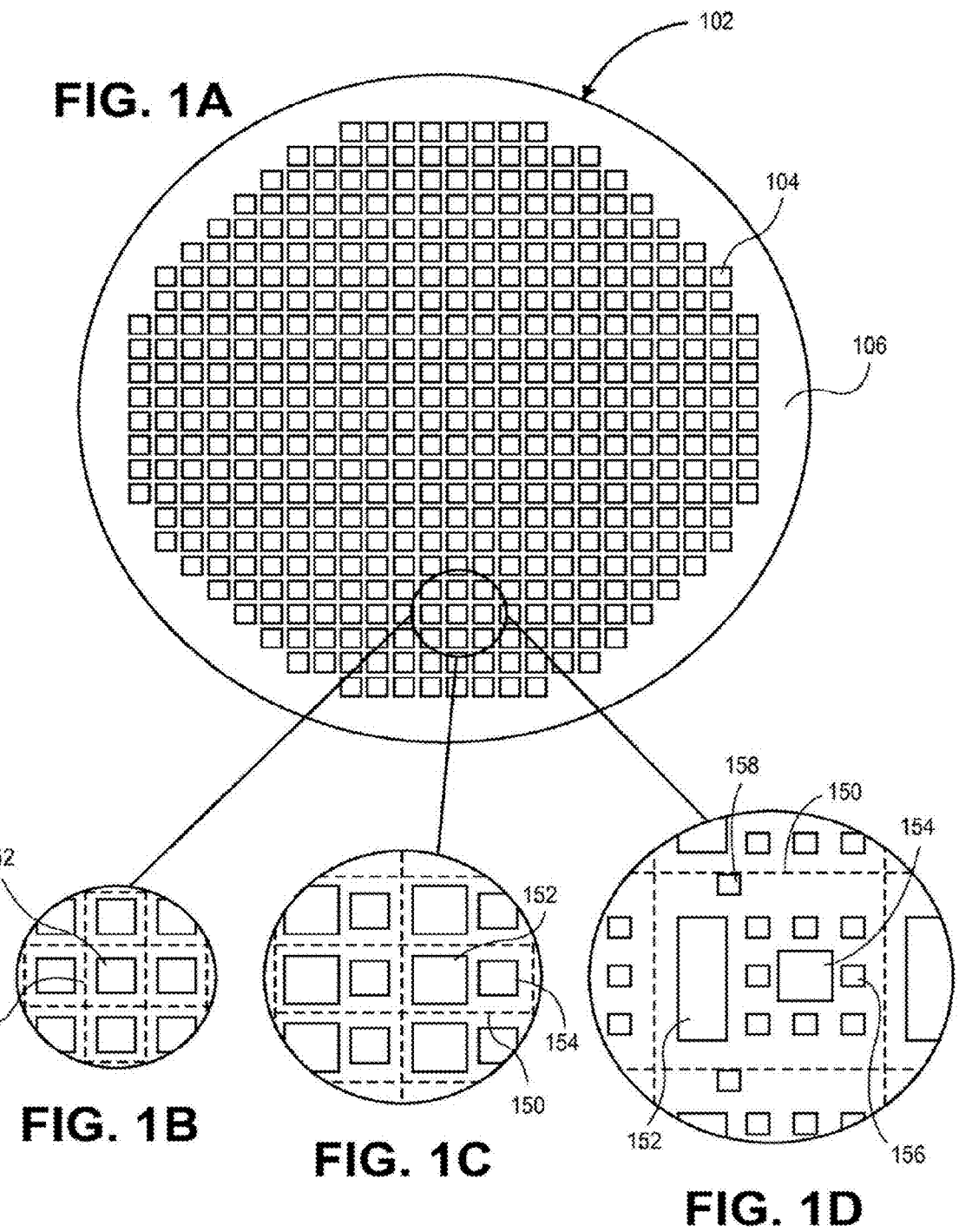

INTEGRATED CIRCUIT PACKAGE AUTO-ROUTING

RELATED APPLICATIONS

This application is a continuation-in-part of application Ser. No. 12/876,915, filed Sep. 7, 2010, which claims the benefit of U.S. Provisional Application No. 61/305,125, filed Feb. 16, 2010, all of which are hereby incorporated by reference.

TECHNICAL FIELD

Embodiments of the present invention relate to the field of panelized packaging.

BACKGROUND

A common implementation of panelized packaging gaining acceptance in industry is fan-out wafer level packaging (WLP) in which multiple die units are placed face down on a temporary tape carrier. The carrier is overmolded with epoxy molding compound using a compression molding process. After molding, the carrier tape is removed to leave the active surface of the multiple die exposed in a structure commonly referred to as a reconstituted wafer. Subsequently, a wafer level chip scale package (WLCSP) build-up structure is formed on top of the reconstituted wafer. Ball grid array (BGA) solder balls are attached to the reconstituted wafer and then the reconstituted wafer is saw singulated to form individual packages. It has been observed that the die placement and overmolding processes may cause displacement and/or rotation of the die, resulting in defective packages and yield loss.

BRIEF DESCRIPTION OF THE DRAWINGS

The present disclosure is illustrated by way of example, and not by way of limitation, in the figures of the accompanying drawings.

FIGS. 1A-1D illustrate a top view of packages or modules arranged in a reconstituted wafer according to an embodiment.

DETAILED DESCRIPTION

Figure 2A:
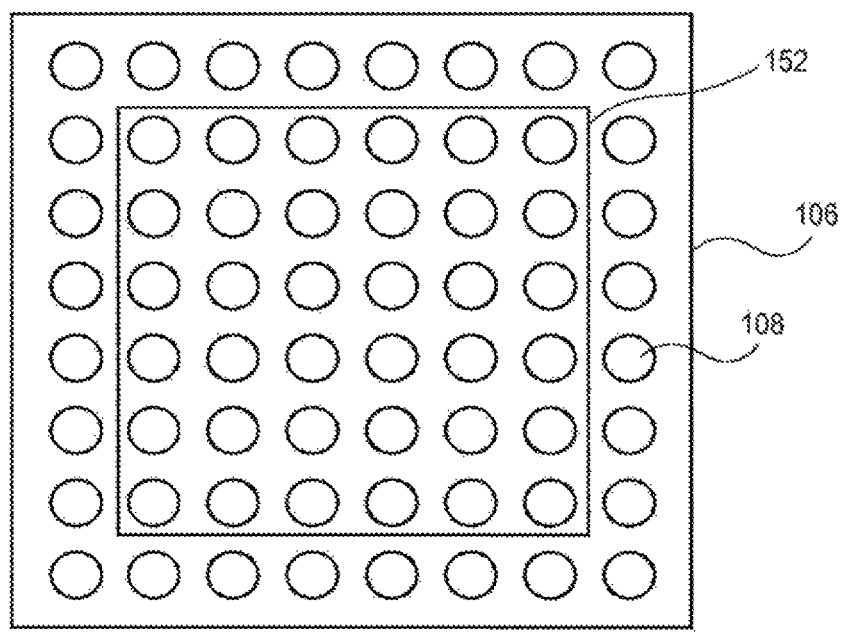
FIG. 2A illustrates a top view of an embodiment of a semiconductor device package.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

The terms "over", "between" and "on" as used herein refer to a relative position of one layer with respect to other layers. One layer deposited or disposed over or under another layer may be directly in contact with the other layer or may have one or more intervening layers. One layer deposited or disposed between layers may be directly in contact with the layers or may have one or more intervening layers. In contrast, a first layer "on" a second layer is in contact with that second layer.

The embodiments disclosed herein include methods and structures applicable to panelized packaging, such as fan-out WLCSP. In the following description, specific embodiments are described with regard to single die applications. Embodiments of the present invention may also be useful in multi-die modules or some combination of die and passive components (such as capacitor, inductor, or resistor) and/or other components (such as an optical element, connector, or other electronic component) within modules.

One embodiment of a process for packaging semiconductor die units may decrease an amount of time needed for auto-routing the package layout by reducing the length of traces to be auto-routed, and by utilizing parallel processing to decrease the computation time for calculating trace geometry.

In one embodiment, a system for packaging the semiconductor die units may construct a prestratum that includes a set of partially routed traces to minimize variance in the auto-routed traces and to reduce the compute time used to perform the auto-routing. The system may further use General Purpose graphics processing unit (GPU) computing to accelerate raster-based auto-routing of the package layout.

In one embodiment, the routing process for a panel of semiconductor die units may be distributed over multiple compute-nodes such that the traces associated with multiple die units are routed in parallel. By decreasing the time for performing the auto-routing, the time for generating a die layout for a fan-out WLP may be decreased accordingly. In one embodiment, the system may also allow real-time adjustment of layouts before exposure of a wafer.

In certain systems, routing of an integrated circuit package may take from approximately 100 seconds up to several hours for a single package; thus, for a fan-out WLCSP application where each wafer or panel may contain thousands of packages each requiring a uniquely routed pattern, the time for automatically routing all units on the wafer or panel may exceed 10 hours. An embodiment of a system for auto-routing that applies a prestratum and performs auto-routing computations in parallel may reduce the time for routing an entire panel of die units to less than 60 seconds.

With reference to FIG. 1A, in an embodiment, the packaging process may begin with a panel 102 including a plurality of device units 104 overmolded with an encapsulating material 106 such as an epoxy resin. While FIG. 1A illustrates a circular panel 102, alternative panel formats such as rectangular or square may be utilized. As illustrated in FIG. 1A, the active surfaces of the plurality of device units 104 may be substantially flush with the encapsulating material 106. In an embodiment, panel 102 may be what is known in the art as a reconstituted wafer formed in a WLP technique where the plurality of device units are placed face down on a temporary tape carrier, followed by overmolding with epoxy molding compound using a compression molding process, followed by removal of the temporary tape carrier leaving the active surfaces of the plurality of die units exposed.

Subsequently, a build-up structure may be formed on top of the structure illustrated in FIG. 1A and the device units may be singulated to form packages or modules. For example, as illustrated in FIG. 1B, the panel may be singulated into a plurality of single-die packages 150, each package including a single semiconductor die unit 152. Referring to FIG. 1C, a plurality of die units 152, 154 may be mounted within the molded panel and singulated to form multi-die packages or modules 150. Referring to FIG. 1D, a single die unit 152 or a plurality of die units 152, 154 may be mounted within the molded panel with the addition of a passive device(s) 156 (such as capacitor, inductor or resistor) and/or other component(s) 158 (such as an optical element, connector or other electronic component) and singulated to form a packages or modules 150 which include both an active device(s) and a passive device(s) and/or other component 158. A variety of combinations of active and passive devices and optionally other components within packages or modules are envisioned in accordance with embodiments of the present invention. Accordingly, the particular configurations illustrated in FIGS. 1B-1D are meant to be illustrated rather than limiting.

In the following discussion, certain embodiments are described with regard to the formation of a single die fan-out WLCSP, though embodiments of the invention are not limited to such. Embodiments of the present invention may be used in any panelized packaging application including single-die applications, multi-die modules, some combination of a die (s) and a passive component(s) within a module, or some combination of a device unites) and another component(s) within a module. In one aspect, embodiments of the present invention may eliminate or reduce package or module assembly yield loss caused by misalignment of the device unit or other component during panelization. In another aspect, embodiments of the present invention may maintain compliance to the package or module outline and not require changes to the position of UBM pads or BGA balls. Maintaining compliance with the package or module outline can be consistently achieved in the final product, e.g. as end-product package, test socket, etc. In another aspect, certain embodiments may allow for a smaller bond pad opening on the device units.

Figure 2B:
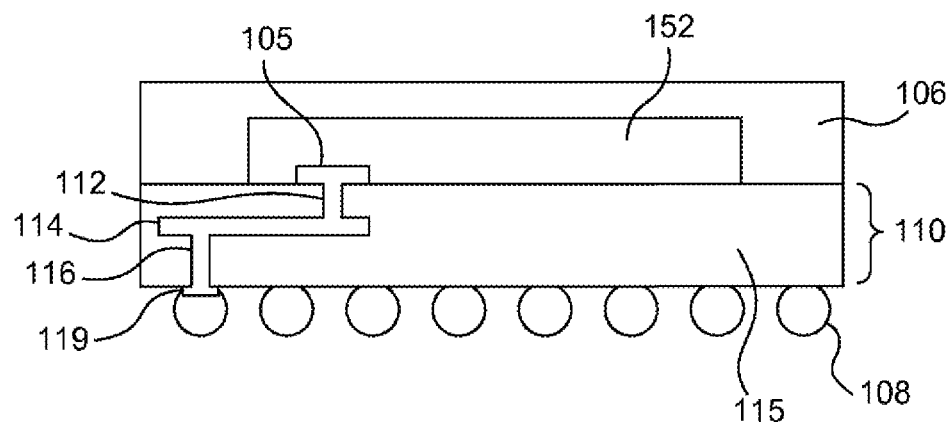
FIG. 2B illustrates a side view of an embodiment of a semiconductor device package.

With reference to FIGS. 2A-2B, ball grid array (BGA) balls 108 are attached and the panel is saw singulated to form individual packages. The CSP build-up structure 110 may be formed over the active surface of each individual die unit before singulation. While build-up structure 110 in FIG. 2B is illustrated as including a single dielectric layer 115, it is understood that multiple layers may be used to form build-up structure 110. Build-up structure 110 may be formed from a dielectric material 115 within which is included a first via 112 which is in electrical contact with a bond pad 105 of the die unit 152. A redistribution layer (RDL) 114 is formed which may span under the bond pad 105, first via 112, and over an underbump metallurgy (UBM) via 116, UBM pad 119, and BGA ball 108. BGA ball 108 is illustrated in FIG. 2B as a solder ball, though is not limited to such. In other embodiments, multiple dielectric layers and device interconnect traces, which may or may not be associated with the RDL, are formed in accordance with the principles described herein. Such multi-layer build-up structures can be utilized in both single-die package applications as well as multi-device modules.

In one embodiment, a pad such as pad 105 may be referred to herein as a "bond pad" whether or not any wire is bonded to the pad. The bond pad may thus be any point where an electrical connection can be made for supplying signals to or receiving signals from the circuits integrated within the die unit.

Figure 2C:
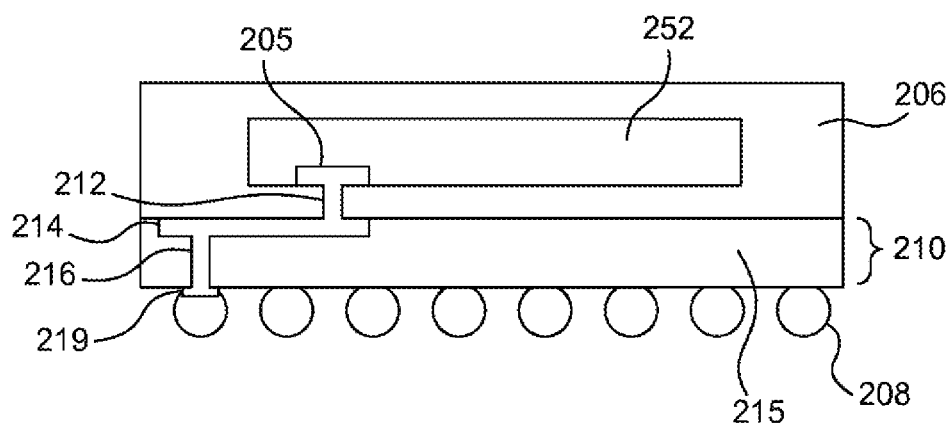
FIG. 2C illustrates a side view of another embodiment of a semiconductor device package.

FIG. 2C illustrates a side view of a semiconductor device package, according to an embodiment. In one embodiment, a die unit 252 may be encapsulated within a mold compound 206 substantially covering all sides of the die unit 252, including the active surface of the die 252. In one embodiment, a conductive spacer element 212 may be used to provide spacing between the die unit 252 and a carrier during the molding process, such that the mold compound 206 can cover the active surface of the die unit 252. The conductive spacer element 212 may be implemented as a copper post attached to a bond pad 205 of the die unit 252, and may be exposed at the surface of the mold compound 206 after the molding process has been performed.

In one embodiment, build-up structure 210 may be constructed using dielectric material 215, and may include a redistribution layer (RDL) 214, which further connects the conductive spacer 212 to a UBM via 216 and UBM pad 219. Solder balls such as solder ball 208 may be added to the UBM pads, including UBM pad 219.

Figure 3:
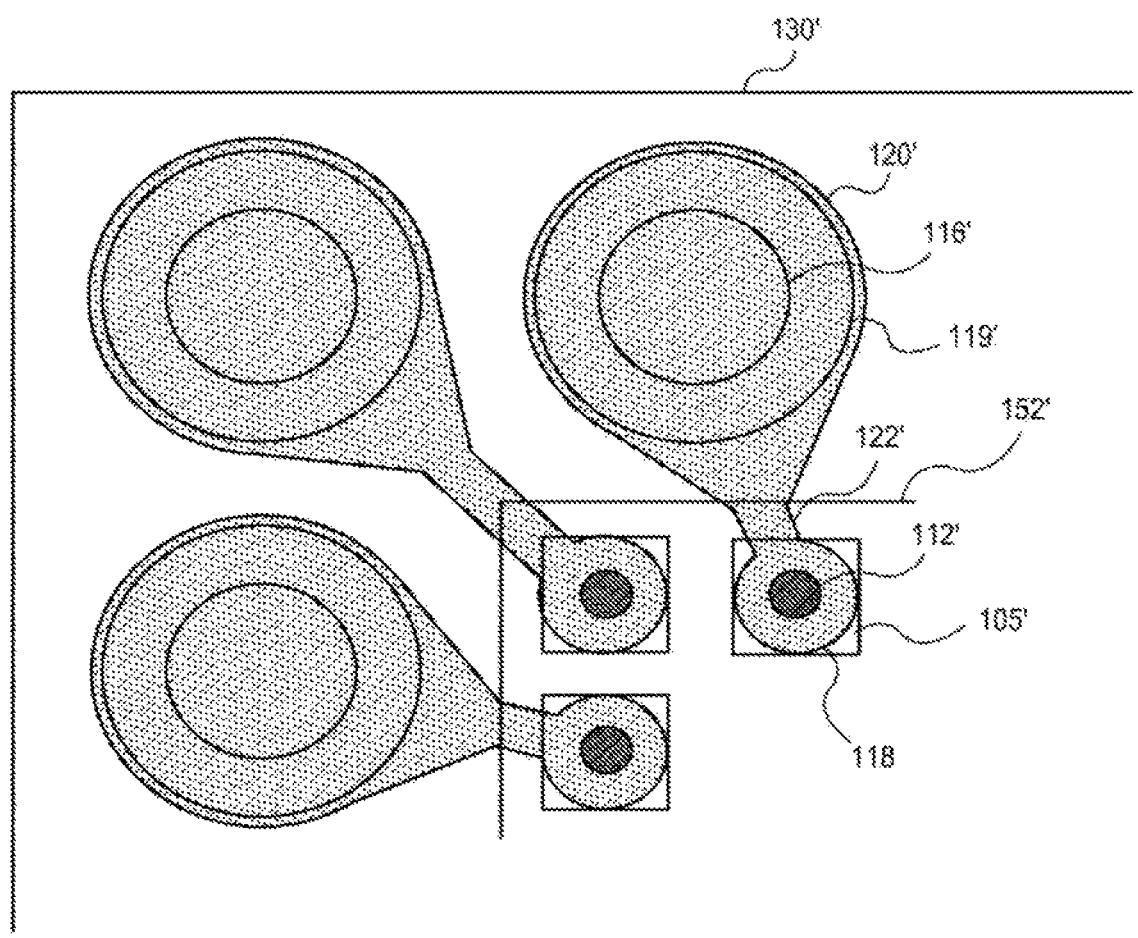
FIG. 3 illustrates a close-up view of a semiconductor device package, according to an embodiment.

FIG. 3 illustrates a portion of one embodiment of a panel design, including components for connecting a semiconductor die unit to its corresponding UBM capture pads. As illustrated, an upper left-hand corner of an individual package outline is shown, however it is understood that the panel design may include additional or less information for the individual die package, and that the panel design may include similar information for each of the plurality of die units of the panel.

As illustrated in FIG. 3, the panel design may define designed true positions for each die within the panel, as well as designed true positions for yet to be formed features. In an embodiment, the designed true positions for the die 152' and bond pad 105' are defined. Features which have not yet been formed over the panel may include designed true positions for the first via 112', die via capture pad 118', UBM via 116', UBM via capture pad 120', RDL pattern trace 122', UBM pad 119', and package outline 130' of a package to be singulated from the panel.

In one embodiment, die unit placement and overmolding may cause displacement and/or rotation of the orientation of any of the plurality of die units 152 on the temporary tape carrier. This may be attributed to the die units not being rigidly attached to the temporary tape carrier as well as shrinkage of the molding compound during curing of the molding compound. As a result, the plurality of die units 152 on panel 102 may not lie in their designed true positions after compression molding.

Misalignment of the individual die units may cause some of the packages which are subsequently singulated from the panel to be defective. In accordance with embodiments of the present invention, misalignment of the individual die units is adjusted for by utilizing an adaptive patterning technique which may additionally implement mask-less lithography to pattern features of the build-up structure 110. Laser ablation and direct write exposure are examples of suitable mask-less patterning techniques in accordance with embodiments of the present invention.

In one embodiment, adaptive patterning may be used when constructing a redistribution layer such as RDL 114, as illustrated in FIG. 2B. For example, the bond pads, such as bond pad 105, of die unit 152 may have a fixed position relative to the die unit 152; however, the positions of the bond pads relative to the UBM pads may shift if the die unit 152 is moved. Thus adaptive patterning of RDL 114 may compensate for the differences in position between the bond pads and the UBM pads. Similarly, adaptive patterning may be used when constructing a redistribution layer such as RDL 214, as illustrated in FIG. 2C. The spacer element 212 may be in a fixed position with respect to the die unit 252, and the pattern of layer 214 may be adapted to adjust for movement of the die unit 252 within the package.

In one embodiment, an adaptive patterning method may be used to construct a pattern than connects the bond pads of one or more die units that are not aligned in the designed true position. Such an adaptive patterning method may include constructing a prestratum that includes a first set of traces of a RDL. In one embodiment, the prestratum may be constructed before the semiconductor die units are placed on a carrier element; alternatively, the prestratum may be constructed after the die units are placed on the carrier. In one embodiment, the prestratum may be constructed at the same time as a second set of auto-routed traces of the RDL.

In one embodiment, the traces making up the prestratum, may include any conductive feature through which an electrical signal may be carried. In one embodiment, the prestratum may include only a set of pads or vias. In an alternative embodiment, the prestratum may include conductive paths having lengths that are greater than their widths. In one embodiment, the prestratum may also include one or more ground planes or other complex features. The traces of the prestratum may be deposited or applied to a surface in one or more layers of conductive material.

After placement of the die units on the carrier and overmolding the die units with a mold compound, trace geometry may be calculated for a second set of traces that complete the RDL. In one embodiment, at least one of the traces in this second set may be electrically connected to at least one of the first set of traces in the prestratum. In one embodiment, constructing the second set of traces includes completing the electrical connection between one or more of the bond pads of a semiconductor die unit to a corresponding destination pad, such as a UBM capture pad. Thus, a given bond pad of a die unit may be electrically connected to its corresponding UBM capture pad through one of the first set of traces (in the prestratum) and through one of the second set of traces.

In one embodiment, the RDL may be electrically connected to the bond pads of the semiconductor die unit through one or more conductive structures, such as copper posts attached to the bond pads. For example, the auto-routed second set of traces of the RDL may be connected directly to copper posts or other conductive structures that are in turn electrically connected to the bond pads of the die unit.

In one embodiment, the traces of the prestratum are connected to the bond pads (or conductive structures connected to the bond pads) and the remaining traces of the RDL (which are the second set of traces) connect endpoints of the prestratum traces to the destination pads. In an alternative embodiment, the prestratum traces may be connected to the destination pads and the second set of traces may connect the endpoints of the prestratum traces to the die unit bond pads. In one embodiment, the start and end points of individual traces of an RDL for a WLCSP design may be via capture pads overlying the die bond pads and UBM via capture pads underlying the UBM.

The system thus calculates trace geometries for the second set of traces to create a trace pattern that makes the connections as described above. The completed RDL pattern may then be constructed by constructing the first set of traces of the prestratum and the second set of adaptive auto-routed traces according to the calculated trace geometry.

In one embodiment, apparatus for performing the packaging process may include plating equipment for depositing metal ions from a solution onto a wafer. Alternatively, the apparatus may include some other equipment capable of depositing conductive material onto the wafer. The packaging equipment may also include a computer system having multiple compute nodes to perform trace geometry calculations in parallel. In one embodiment, the trace geometry calculations may be performed by a number of GPUs operating in parallel.

Figure 4:
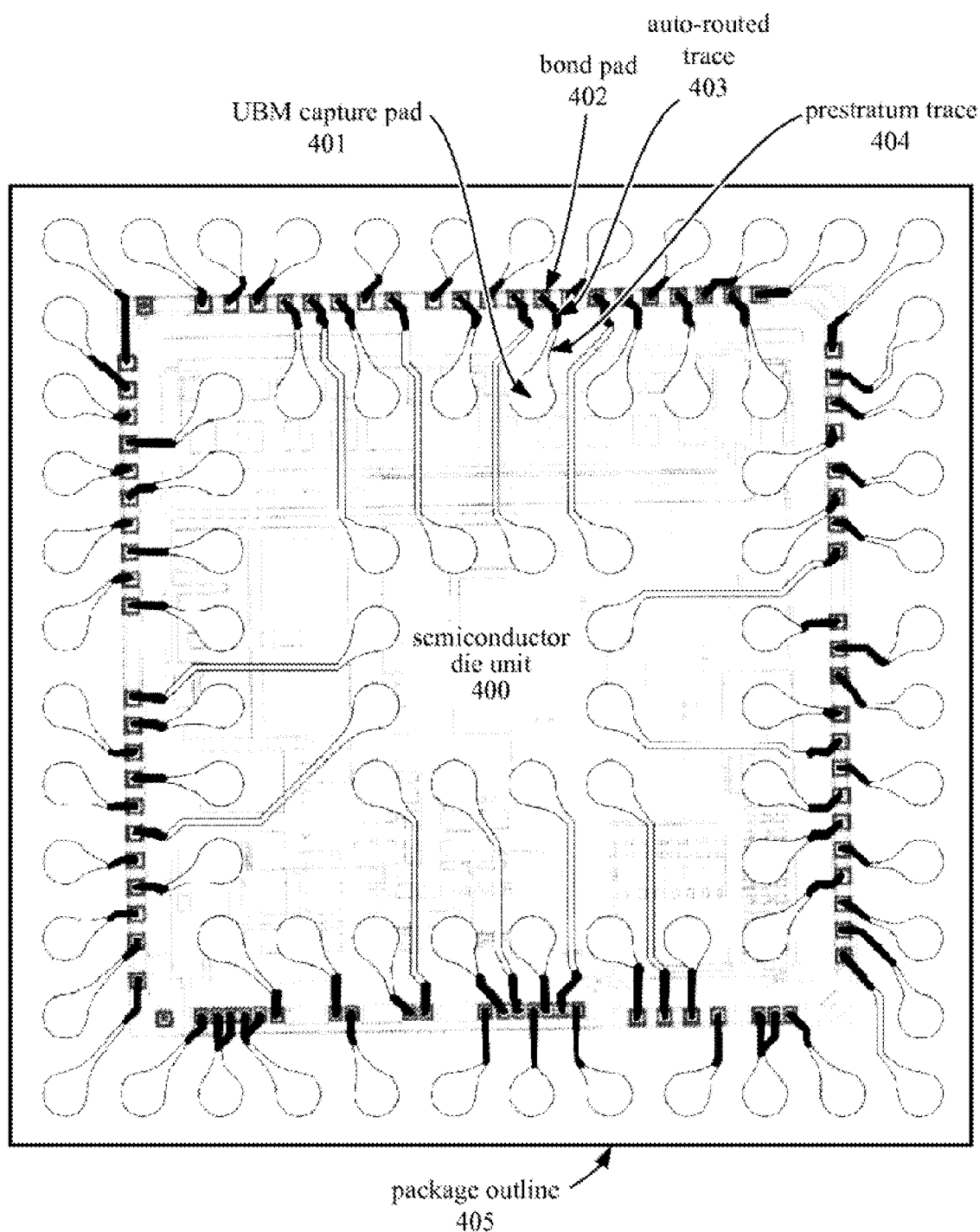
FIG. 4 illustrates a redistribution layer of a semiconductor device package with partially auto-routed traces, according to an embodiment.

FIG. 4 illustrates an embodiment of a semiconductor die unit 400, along with the outline 405 of a package containing the die unit 400. The package further includes a redistribution layer (RDL) including the illustrated light traces (representing a first set of prestratum traces) and dark traces (representing a second set of auto-routed traces), which include traces 403 and prestratum trace 404.

In one embodiment, the traces of the RDL electrically connect bond pads of the die unit 400 with corresponding UBM capture pads. For example, the bond pad 402 of die unit 400 is electrically connected to UBM capture pad 401 through trace 403 and prestratum trace 404.

In one embodiment, a semiconductor die unit may typically be shifted by up to ±100 microns in both X and Y directions, and/or rotated up to ±5 degrees relative to its designed true position. For example, the semiconductor die unit 400, as illustrated, is shifted from a designed true position by 40 microns in the X direction, 40 microns in the Y direction, and by an angle θ of 1 degree. In one embodiment, trace geometry for the darkened traces, such as trace 403, may be automatically calculated after the die unit 400 is placed on the carrier element and overmolded.

Figure 5:
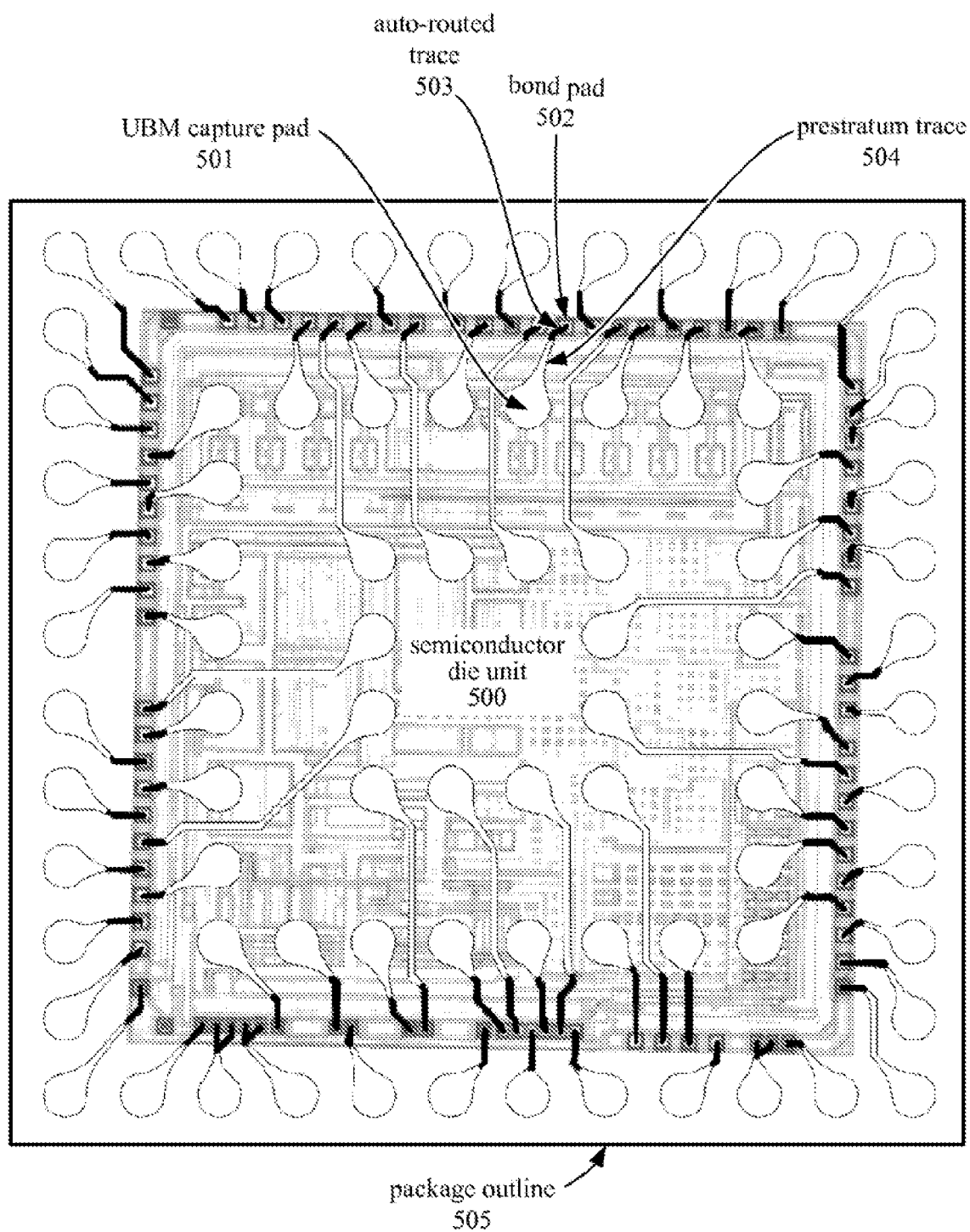
FIG. 5 illustrates a redistribution layer of a semiconductor device package with partially auto-routed traces, according to an embodiment.

FIG. 5 illustrates an embodiment of a semiconductor die unit 500, along with the outline 505 of a package containing the die unit 500. The package further includes a redistribution layer (RDL) including the illustrated light and dark traces, which include traces 503 and prestratum trace 504.

In one embodiment, the traces of the RDL electrically connect bond pads of the die unit 500 with corresponding UBM capture pads. For example, the bond pad 502 of die unit 400 is electrically connected to UBM capture pad 501 through trace 503 and prestratum trace 504.

In contrast with semiconductor die unit 400, the semiconductor die unit 500, as illustrated, is shifted from a designed true position by −40 microns in the X direction, −40 microns in the Y direction, and by an angle θ of −1 degree. In one embodiment, trace geometry for the dark traces, such as trace 503, may be automatically calculated after the die unit 500 is placed on the carrier element and overmolded.

As compared to the auto-routed traces illustrated in FIG. 4, the auto-routed traces of FIG. 5 are different to adapt to the different orientation of the semiconductor die unit 500 relative to the endpoints of the prestratum traces. In one embodiment, the set of prestratum traces as illustrated in FIGS. 4 and 5 are similar regardless of the orientation of the semiconductor die unit. In one embodiment, the die units as illustrated in FIGS. 4 and 5 may be part of the same reconstituted wafer; thus, even though each of the die units 400 and 500 have a different orientation relative to the designed true positions, the auto-routing process adapts the trace geometries to accommodate the particular placements of each of the die units.

Figure 6:
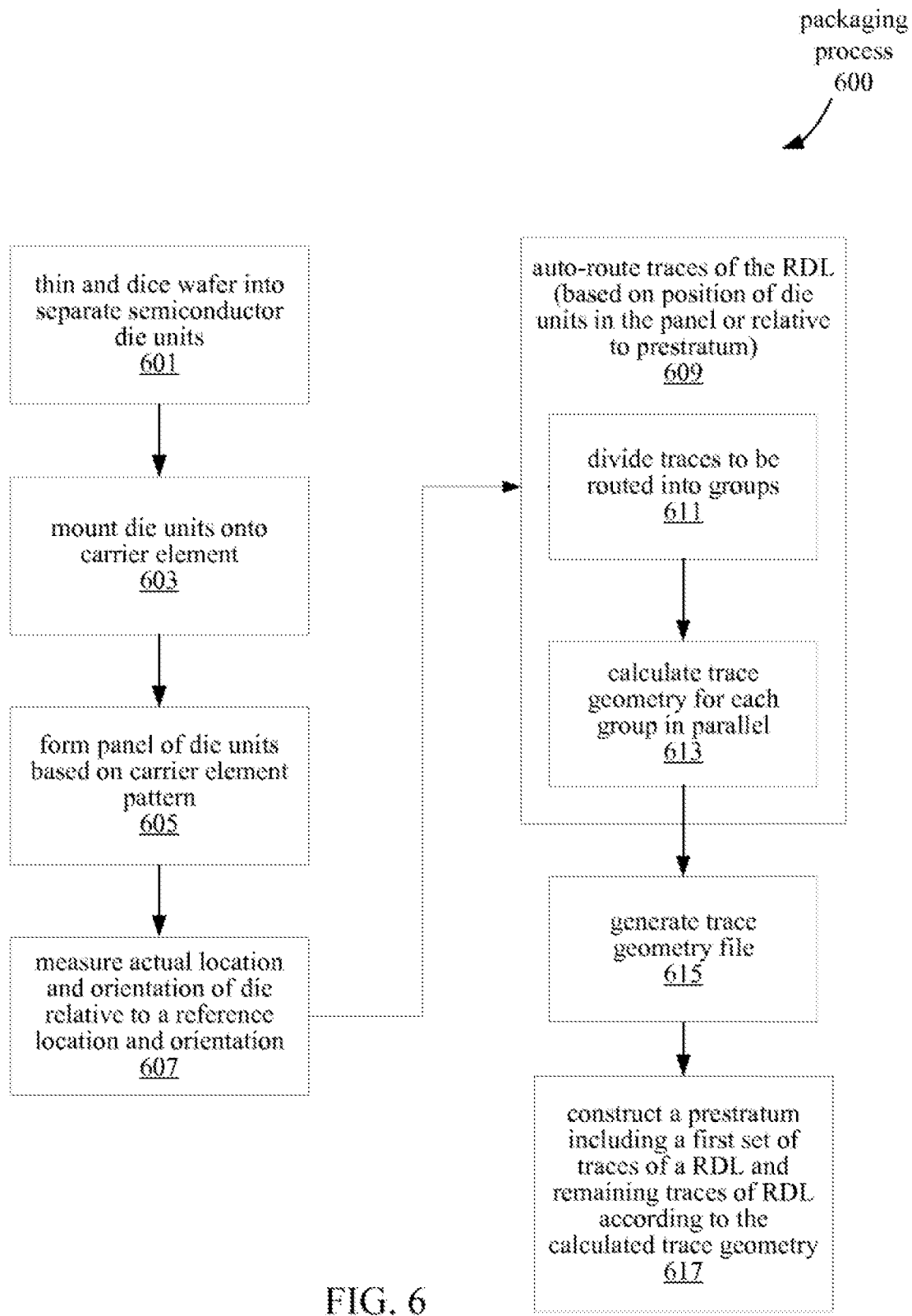
FIG. 6 is a flow diagram illustrating a process for packaging one or more semiconductor die units, according to an embodiment.
Figure 7:
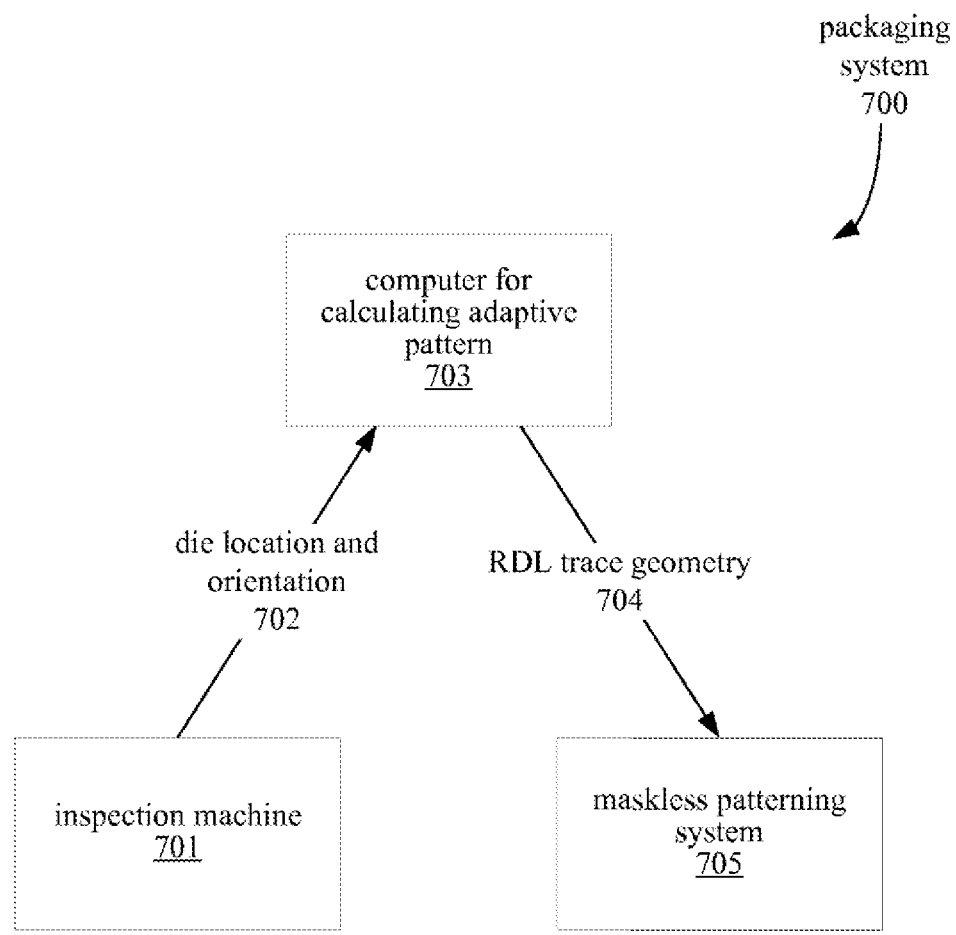
FIG. 7 is a block diagram illustrating an embodiment of a system for packaging one or more semiconductor die units.

FIG. 6 is a flow diagram illustrating an embodiment of a process for packaging a semiconductor die unit, such as die unit 400 or 500. FIG. 7 illustrates an embodiment of a packaging system 700 that may be used for performing the packaging process 600. In one embodiment, the packaging system 700 performing process 600 may create, for each wafer, a unique file encoding trace geometries 704 that compensate for any shifts in the wafer's orientation relative to the destination pads. The file may encode both a fixed portion, such as a prestratum, and an adaptive auto-routed portion of the RDL traces as calculated by a computer 703 based on the location and orientation 702 of one or more die units as determined by an inspection machine 701. In one embodiment, the adaptive patterning method may be applied to multiple semiconductor die units on a wafer or panel, such that the output trace geometry file 704 describes a full wafer or panel design including a plurality of unique adaptive designs. In one embodiment, both the prestratum and the adaptive traces may be implemented on the same layer. In one embodiment, the trace geometry file 704 may be uploaded to a maskless patterning tool 705 that may create the pattern using laser ablation, direct write exposure, conductive writing, or any other method that can make a pattern without using a mask. Packaging process 600 begins at block 601.

At block 601, a semiconductor wafer may be thinned and diced into separate semiconductor die units. The die units are mounted in a pattern on a carrier element at block 603. From block 603, the process 600 continues at block 605.

At block 605, a panel of die units is formed based on the carrier element pattern. In one embodiment, the semiconductor die units may be overmolded with a mold compound, resulting in a reconstituted wafer. In one embodiment, the overmolding process may be a compression molding process using a mold compound such as epoxy resin. From block 605, the process 600 continues at block 607.

At block 607, a scanner or other inspection machine 701 may be used to measure an actual location and orientation 702 of each of the die units relative to a designed true location and orientation. In one embodiment, the inspection machine 701 may measure an angular rotation of the die units in addition to a displacement of the die units in the X-Y plane in which the die units are laid. From block 607, the process 600 continues at block 609.

At block 609, a computer system 703 may be used to calculate the trace geometry 704 for the RDL, which includes a first set of traces making up the prestratum and a second set of auto-routed traces. In one embodiment, the prestratum includes a first set of traces of the RDL, and is designed to decrease the length and variance of traces to be auto-routed, thus decreasing the amount of time used for calculating the trace geometry for the auto-routed traces.

In one embodiment, trace geometry for the auto-routed traces is generated based on the location and orientation of the die units relative to the designed true location, as measured at block 607. In one embodiment, the auto-routing process may calculate the trace geometries for electrically connecting the endpoints of the prestratum traces to either the semiconductor bond pads or destination pads. The auto-routing process may include operations as represented by blocks 611 and 613.

In one embodiment, the auto-routing process can route many dies sufficiently quickly (for example, less than 60 seconds) such that wafer layouts can be adjusted for shifts in die position. Thus, the wafer layout may be uniquely determined to compensate for die shifts caused by the placement and molding process, thereby increasing the manufacturing yield.

The auto-routing process may thus take place after placement of the semiconductor die units on a carrier element, and may further take place after the overmolding process has been performed to yield a reconstituted wafer, as illustrated in FIG. 1. In one embodiment, the prestratum may be constructed together with the auto-routed traces after the auto-routing has been performed; alternatively, the auto-routing may take place after the construction of the prestratum.

In one embodiment, multiple packages may be auto-routed in parallel (concurrently) in a distributed computing system to achieve sufficient speed for real-time routing. In one embodiment, the trace routing may be performed using a raster or grid-based pathfinding algorithm (which may determine a path between a start and an end point), such as A* or Dijkstra's algorithm, among others. In one embodiment, such a grid-based pathfinding algorithm may compute a path between start and end points on a single die defined by a netlist for the die.

In one embodiment, the auto-routing process may include routing of corresponding or similar nets from multiple die units in parallel, with each of the parallel routing processes accounting for shifts in die position. In one embodiment, the routing process may perform an A search algorithm using GPU multiprocessors to allow many routing processes to run concurrently. Lookups (queries) into the grid may also be processed in parallel by the GPU.

At block 611, the traces to be auto-routed may be divided into groups to be processed in parallel. In one embodiment, these unrouted traces may be represented as start and end point locations, such as the endpoint locations of prestratum traces, or the locations of bond pads or UBM capture pads. In one embodiment, traces that are associated with the same semiconductor die unit may be grouped together. Traces may also be grouped based on other criteria, such as similarity. Thus, each group includes a subset of traces from the second set of traces, which are the traces of the RDL to be auto-routed.

Thus, in one embodiment, the process divides the dies to be auto-routed into groups that can be processed separately, with the results of the routing later merged together. This allows the process to run distributed on a cluster of compute-nodes. From block 611, the process 600 continues at block 613.

At block 613, the trace geometry for each group of traces may be calculated in parallel. In one embodiment, the trace geometry may be calculated by the computer system 703 using multiple GPUs operating in parallel.

In one embodiment, the adaptive patterning method includes calculating the trace geometry for the second set of traces by using a raster based auto-routing process. In one embodiment, performing the raster based routing process includes creating a raster representation based on endpoints of each of the prestratum traces and the locations of either the destination pads, or the bond pads of the semiconductor die units.

In one embodiment, a raster representation may model a regular grid over the entire design space to be routed, such that each start and end point lies on an intersection between grid lines. Using this raster representation, the routing process may find a path by following one or more of the grid lines to connect a start point and an end point.

In an alternative embodiment, the process 600 may be adapted to use a topological routing method on a computer system 703 that is a distributed and GPU-accelerated platform. A process using a topological approach may, for example, link obstacles (such as the start and end points) together to create triangles, then find paths around obstacles by crossing successive triangle edges.

In one embodiment, after all groups of traces on the wafer or panel are routed in parallel, the routed groups are combined into a full panel design such that each unique trace pattern is aligned with its corresponding die unit on the panel. From block 613, after the auto-routing is completed, the process 600 may continue at block 615.

At block 614, the computer system 703 performing the auto-routing may generate a trace geometry file 704 based on the results of the auto-routing. In one embodiment, such a trace geometry file 704 may encode the full panel design in a format that can be read by a maskless patterning system 705. In one embodiment, the trace geometry file 704 may include the geometry for both the first set of prestratum traces and the second set of auto-routed traces. In one embodiment, both sets of traces may be represented in the trace geometry file 704 as being formed from the same layer of conductive material. From block 615, the process 600 continues at block 617.

At block 617, the RDL, including the prestratum and auto-routed traces, is constructed. In one embodiment, the RDL may be constructed using a maskless patterning system 705. In one embodiment, constructing the prestratum includes electrically coupling the prestratum traces to each of a number of bond pads of the semiconductor die units. In an alternative embodiment, constructing the prestratum may include constructing traces that are electrically coupled to each of a number of destination pads, such as UBM via capture pads. In one embodiment, the prestratum may include partially routed traces of the RDL that travel only part of a route from a bond pad to a destination pad, or vice versa. The prestratum may also include complex features such as one or more ground planes. In one embodiment, the trace geometry for the prestratum traces are determined in advance of placing and overmolding of the semiconductor die units.

At block 617, the auto-routed portion of the RDL traces is also constructed, and may be constructed according to the trace geometry calculated at block 613. In one embodiment, constructing the auto-routed traces may include electrically connecting at least one of the prestratum traces to at least one of the auto-routed traces. In one embodiment, constructing the auto-routed traces may include electrically connecting at least one of the bond pads of a semiconductor die unit to a destination pad, such as a UBM via capture pad, through a prestratum trace and an auto-routed trace which are connected together.

In one embodiment, the auto-routed traces and the prestratum traces are constructed from the same layer of conductive material. For example, the prestratum traces and the auto-routed traces may be represented in a trace geometry file 704 as being formed from a single layer, such that the prestratum traces and the auto-routed traces are formed at the same time. In an alternative embodiment, the prestratum and the auto-routed traces may be formed from different layers of conductive material, or may be constructed at different times or different sequences.

In an alternative embodiment, the auto-routed traces may be constructed prior to construction of the prestratum. For example, the trace geometries for the auto-routed portion of the RDL may be calculated and the auto-routed portion constructed prior to constructing the prestratum, which is then constructed to connect the endpoints of the auto-routed traces to either the semiconductor die unit bond pads, or to destination pads such as a UBM via capture pad.

After construction of both the first set of prestratum traces and the second set of auto-routed traces, the completed RDL connects bond pads of each semiconductor die unit to a corresponding destination pad, such as a UBM via capture pad.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:
1. An adaptive patterning method, comprising:
   placing a semiconductor die unit on a carrier element;
   after placement of the semiconductor die unit on the carrier element, calculating trace geometry for a second set of traces;
   dividing the second set of traces into a plurality of subsets of traces;
   simultaneously calculating trace geometry for each subset of traces;
   constructing a prestratum comprising a first set of traces; and constructing the second set of traces according to the calculated trace geometry, wherein constructing the second set of traces comprises:
  electrically connecting at least one of the first set of traces to at least one of the second set of traces; and
  electrically connecting at least one bond pad of the semiconductor die unit to a destination pad through the at least one of the first set of traces and the at least one of the second set of traces.

2. The adaptive patterning method of claim 1, wherein constructing the second set of traces comprises electrically coupling each of the first set of traces to a corresponding destination pad.

3. The adaptive patterning method of claim 1, wherein the destination pad is one of a plurality of under bump metallurgy (UBM) capture pads.

4. The adaptive patterning method of claim 1, wherein each of the first set of traces is electrically coupled to one of a plurality of bond pads associated with a plurality of semiconductor die units.

5. The adaptive patterning method of claim 1, wherein each of the second set of traces is electrically coupled through one or more conductive structures to a corresponding one of a plurality of bond pads of a semiconductor die unit.

6. The adaptive patterning method of claim 1, wherein the trace geometry for the subsets of traces are calculated using a plurality of graphics processing units (GPUs) operating in parallel.

7. The adaptive patterning method of claim 1, wherein calculating the trace geometry for the second set of traces comprises performing a raster based routing process.

8. The adaptive patterning method of claim 7, wherein performing the raster based routing process comprises creating a raster representation based on endpoints of each of the first set of traces and based on locations of each of a plurality of destination pads.

9. The adaptive patterning method of claim 1, wherein the second set of traces is constructed prior to constructing the first set of traces.

10. The adaptive patterning method of claim 1, wherein the first set of traces and the second set of traces are formed from a single layer of conductive material.

11. A computer implemented adaptive patterning method, comprising:
  placing a plurality of semiconductor die units on a carrier;
  designing with a computer a first portion of a redistribution layer (RDL), wherein the RDL is configured to electrically connect each of a plurality of bond pads of the plurality of semiconductor die units to a corresponding one of a plurality of destination pads;
  after placement of the plurality of semiconductor die units on the carrier, calculating with the computer trace geometry for a second portion of the RDL; and
  constructing the first portion of the RDL according to the design of the first portion of the RDL and constructing the second portion of the RDL according to the calculated trace geometry.

12. The computer implemented adaptive patterning method of claim 11, wherein constructing the first portion of the RDL further comprises constructing a first plurality of traces each electrically coupled to at least one of the plurality of bond pads, and wherein constructing the second portion of the RDL further comprises constructing a second plurality of traces configured to electrically couple the first plurality of traces to the plurality of destination pads.

13. The computer implemented adaptive patterning method of claim 11, wherein the plurality of destination pads comprise a plurality of under-bump metallurgy (UBM) capture pads.

14. The computer implemented adaptive patterning method of claim 11, further comprising:
  dividing the second set portion of the RDL into a plurality of subsets of traces; and
  simultaneously calculating trace geometry for each subset of traces.

15. The computer implemented adaptive patterning method of claim 14, wherein the trace geometry for the second portion of the RDL is calculated using a plurality of graphics processing units (GPUs) operating in parallel.

16. The computer implemented adaptive patterning method of claim 11, wherein calculating the trace geometry for the second portion of the RDL comprises performing a raster based routing process, wherein performing the raster based routing process comprises creating a raster representation based on locations of each of the plurality of destination pads and based on trace endpoints of the first portion of the RDL.

17. A system for adaptive patterning, comprising:
  a processor; and
  a memory coupled with the processor, wherein the memory stores instructions that, when executed by the processor, cause the processor to perform a method comprising:
    constructing a first portion of a redistribution layer (RDL);
    calculating trace geometry for a remaining portion of the RDL based on positions of a plurality of semiconductor die units relative to one or more true positions; and
    completing the RDL by constructing the remaining portion of the RDL, wherein the completed RDL is configured to electrically connect a plurality of bond pads of the plurality of semiconductor die units to corresponding destination pads.

18. The system of claim 17, wherein the calculating trace geometry for the remaining portion of the RDL is performed in less than 60 seconds.

19. The system of claim 17, wherein the method further comprises:
  dividing the remaining portion of the RDL into groups of traces; and
  calculating in parallel trace geometry for the groups of traces.

* * * * *